US006949605B2

(12) United States Patent
Shankernarayanan et al.

(10) Patent No.: US 6,949,605 B2

(45) Date of Patent: Sep. 27, 2005

(54) SOFT TOUCH POLYOLEFIN COMPOSITIONS

(75) Inventors: Manivakkam J. Shankernarayanan, Cincinnati, OH (US); Christopher M. Dickerson, Morrow, OH (US)

(73) Assignee: Equistar Chemicals, L.P., Houston, TX (US)

( * ) Notice: Subject to any disclaimer, the term of this patent is extended or adjusted under 35 U.S.C. 154(b) by 114 days.

(21) Appl. No.: 10/457,753

(22) Filed: Jun. 9, 2003

(65) Prior Publication Data

US 2004/0249080 A1 Dec. 9, 2004

(51) Int. Cl.$^{7}$ ............................ C08F 9/00; C08L 23/00; C08L 23/04

(52) U.S. Cl. ........................................ 525/191; 525/240

(58) Field of Search .................................. 525/191, 240

(56) References Cited

U.S. PATENT DOCUMENTS

| | | | | | |
|---|---|---|---|---|---|
| 5,314,746 | A | * | 5/1994 | Johnson et al. | 428/338 |
| 5,587,436 | A | * | 12/1996 | Klimek et al. | 526/59 |
| 5,705,576 | A | * | 1/1998 | Buehler et al. | 526/60 |
| 5,747,592 | A | * | 5/1998 | Huff et al. | 525/191 |
| 6,207,754 | B1 | * | 3/2001 | Yu | 525/133 |
| 6,498,214 | B2 | | 12/2002 | Laughner et al. | |

* cited by examiner

*Primary Examiner*—Nathan M. Nutter

(74) *Attorney, Agent, or Firm*—Brooks Kushman P.C.

(57) ABSTRACT

The present invention provides a soft touch soft touch thermoplastic olefin composition. The soft touch thermoplastic olefin composition comprises a polypropylene-ethylene copolymer and a cross-linked or uncross-linked ethylene-propylene thermoplastic elastomer. The thermoplastic elastomer is present in a sufficient amount that the soft touch thermoplastic olefin composition has a 1% flexural secant modulus from about from about 10,000 psi to about 80,000 psi.

26 Claims, No Drawings

SOFT TOUCH POLYOLEFIN COMPOSITIONS

BACKGROUND OF THE INVENTION

1. Field of the Invention

The present invention relates to soft touch polyolefin compositions and a method of making such soft touch polyolefin compositions, and in particular, soft touch polyolefin compositions that include cross-linked or uncross-linked ethylene-propylene thermoplastic elastomers.

2. Background Art

Thermoplastic polyolefins ("TPO") resins are blends of polypropylene and elastomers. In many applications, TPO resins may include such additives as pigments, antioxidants, stabilizers, and fillers. They can be made by physically blending in an internal mixer, or by polymerizing in a reactor. TPO resins are useful in a number of molding processes, which include, for example, blow molding, injection molding, thermoforming, blown film extrusion, cast film extrusion, sheet extrusion, profile extrusion, and the like. Moreover, TPO resins are used to form a variety of items ranging from automotive components to plastic films to containers.

Each year, polymeric resins are used to form a multitude of plastic containers and storage bottles. In particular, the personal care industry distributes a significant portion of its products in plastic bottles (i.e., shampoo, lotions, and the like.) Furthermore, in the automotive industry, TPO resins are increasingly being used to form interior components. Presently, there is a trend to improve the aesthetics of such containers by improving the tactile softness of these containers when they are held by the user. Similarly, the automotive industry requires that many interior components have an aesthetically pleasing soft touch. The sensation of "softness" tends to be somewhat subjective, without a clear correlation to any particular physical property. However, properties which quantify stiffness and hardness such as the flexural modulus and Shore A hardness relate somewhat to softness and are useful in developing such materials. Currently, there has only been limited success in developing containers formed from polymeric resins that possess the requisite "softness."

Accordingly, there is a need in the prior art to develop polymeric resins, and in particular, TPO resins that will improve softness when touched by the end user. Moreover, such resins should be formed by processes that are economical and relatively easy to implement.

SUMMARY OF THE INVENTION

The present invention overcomes the problems of the prior art by providing in one embodiment a soft touch thermoplastic olefin composition. The soft touch thermoplastic olefin composition comprises a polypropylene-ethylene copolymer and a cross-linked or uncross-linked ethylene-propylene thermoplastic elastomer. The thermoplastic elastomer is present in a sufficient amount that the soft touch thermoplastic olefin composition has a 1% flexural secant modulus from about from about 10,000 psi to about 80,000 psi. The polypropylene-polyethylene copolymers provided in U.S. Pat. No. 5,705,576, U.S. Pat. No. 5,587,436, and U.S. Pat. No. 5,314,746 were found to be particularly useful in practicing the invention. In a particularly preferred embodiment of the invention, the cross-linked or uncross-linked ethylene-propylene thermoplastic elastomer does not contain any $C_4$ or higher α-olefin comonomers, such as for example, 1-butene, 1hexene, 1-octene, and the like. The soft touch thermoplastic olefin composition of the present invention is advantageously used to form such articles as automotive interior components, personal care bottles, over-molded grips, multilayer thermoformed containers, multilayered flexible packaging, multilayered profile pipe, and the like.

In another embodiment of the present invention, a method of forming the soft touch thermoplastic olefin compositions set forth above is provided. The method comprises combining a polypropylene-ethylene copolymer and a cross-linked or uncross-linked ethylene-propylene thermoplastic elastomer to form a mixture and blending the mixture at sufficient temperature to melt the mixture. Typically, the melt temperature is from about 400° F. to about 450° F.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "elastomer" as used herein refers to a rubber polymer having the characteristic of being able to stretch under low stress. Examples of polymers which can be formulated as elastomers are butyl rubber, polyurethane, silicones, and ethylene-propylene copolymers.

The term "plastomer" as used herein refers to a plastic polymer usually added to a blend to confer plastic properties to a mixture. In general, plastomers have higher specific gravities than elastomers.

In an embodiment of the present invention, a soft touch thermoplastic olefin composition is provided. The soft touch thermoplastic olefin composition of the invention comprises a polypropylene-ethylene copolymer and a cross-linked or uncross-linked ethylene-propylene thermoplastic elastomer. The thermoplastic elastomer is present in a sufficient amount that the soft touch thermoplastic olefin composition has a 1% flexural secant modulus from about from about 10,000 psi to about 80,000 psi. More preferably, the thermoplastic elastomer is present in a sufficient amount that the soft touch thermoplastic olefin composition has a 1% flexural secant modulus that is less than about 20,000 psi; most preferably the thermoplastic elastomer is present in a sufficient amount that the soft touch thermoplastic olefin composition has a 1% flexural secant modulus from about 10,000 psi to about 30,000 psi. Most preferably, the thermoplastic elastomer is present in a sufficient amount that the soft touch thermoplastic olefin composition has a 1% flexural secant modulus that is less than about 20,000 psi. In a particularly preferred embodiment, the thermoplastic elastomer is present in a sufficient amount that the soft touch thermoplastic olefin composition has a 1% flexural secant modulus from about from about 10,000 psi to about 20,000 psi. The soft touch thermoplastic olefin composition of the present invention is further characterized by the Shore A hardness as determined from ASTM D2240 and a compression set as determined from ASTM D395. The thermoplastic elastomer is preferably present in a sufficient amount that the soft touch thermoplastic olefin composition has a maximum Shore A hardness of about 80 to 100. More preferably, the thermoplastic elastomer is present in a sufficient amount that the soft touch thermoplastic olefin composition has a Maximum Shore A hardness about 80 to 90; and most preferably, the thermoplastic elastomer is present in a sufficient amount that the soft touch thermoplastic olefin composition has a Maximum Shore A hardness about 80 to 85. Similarly, the thermoplastic elastomer is preferably present in a sufficient amount that the soft touch thermoplastic olefin composition has a compression set from about 67% to about 100%. More preferably, the thermoplastic elastomer is present in a sufficient amount that the soft touch thermoplastic olefin composition has a compression set from about 80% to about 90%.

Preferred polypropylene-polyethylene copolymers are provided in U.S. Pat. No. 5,705,576, U.S. Pat. No. 5,587,436, and U.S. Pat. No. 5,314,746. The entire disclosure of each of these patents is hereby incorporated by reference. The polypropylene-ethylene copolymer preferably has a 1% flexural secant modulus from about 5,000 psi to about 70,000 psi. More preferably, the polypropylene-ethylene copolymer has a 1% flexural secant modulus from about 10,000 psi to about 40,000 psi. In a variation, the polypropylene-ethylene copolymer has a 1% flexural secant modulus from about 15,000 psi to about 35,000 psi. In another variation, the polypropylene-ethylene copolymer has a 1% flexural secant modulus of about 25,000 psi. Moreover, the polypropylene-ethylene copolymer has from about 3 to about 50 weight percent ethylene and having a melt flow from 0.01 to 500 dg/min and melting point from 115° C. to 160° C. More preferably, the polypropylene-ethylene copolymer contains 8 to 40 weight percent ethylene and has a melt flow rate from 0.1 to 100 dg/min and a melting point from 125° C. to 160° C. Most preferably, the polypropylene-ethylene copolymer contains 15 to 30 weight percent ethylene. In a particular preferred variation, the polypropylene-ethylene copolymer is made by the method comprising homopolymerizing propylene in a first reactor maintained at 50° C. to 100° C. and 250 psig to 650 psig in the presence of a catalyst system comprising a titanium-containing catalyst component and organoaluminum cocatalyst component to produce a first product; feeding the first product into a second reactor maintained at 25° C. to 80° C. and 100 psig to 500 psig wherein propylene is copolymerized with ethylene, to obtain high rubber content modified polypropylene having reduced hexane extractables and improved paintability. Moreover, the polypropylene-ethylene copolymer has a control parameter $Q_c$ is calculated using eight integrated areas of the $^{13}C$ NMR spectrum corresponding to molecular structural features for copolymers of propylene and ethylene in accordance with the equation:

$$Q_c=A/B$$

where $A=1.167R_1+0.75R_2+1.5R_3+1.5R_4+1.167R_8$;

$B=0.667R_1+0.5R_2+R_5+R_6+R_7+0.667R_8$; and $R_1$ through $R_8$ have the following peak assignments:

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM; |

(b) the limits of $Q_c$ are selected to be within the range 0.65 to 1.35;

(c) the actual value of the parameter, $Q_A$, is determined for the polymer obtained from the second reactor; and (d) the ethylene feed is controlled to maintain $Q_A$ within the limits defined in (b). In one variation, the limits of $Q_c$ are from about 0.65 to about 1.35, while in a second particularly preferred variation $Q_c$ varies from about 0.90 to about 1.35. Typically, the first and second reactors are stirred, fixed-bed reactors. This preferred method of making the polypropylene-ethylene copolymer will preferably have an amount of ethylene sufficient to incorporate from 15 to 30 weight percent ethylene in the polymer is fed to the second reactor and an amount of hydrogen ranging from 0.1 to 5 mol percent is included in the first reactor and an amount of hydrogen from 1 to 10 mol percent is included in the second reactor. Moreover, one or more α-olefins containing from 4 to 8 carbon atoms included in the polymerization. Suitable polypropylene-polyethylene copolymers include, for example, PP0021, PPTR477, PP7200AF, PPTR346, PP8752HF, and TP 38KC01 commercially available from Equistar Chemicals, LP located in Houston Tex.

As set forth above, the soft touch thermoplastic olefin composition includes a cross-linked or uncross-linked ethylene-propylene thermoplastic elastomer in a sufficient amount that the soft touch thermoplastic olefin composition has a 1% flexural secant modulus from about from about 10,000 psi to about 80,000 psi. Typically, the thermoplastic elastomer is present in an amount from about 1% to about 80% of the total weight of the soft touch thermoplastic olefin composition. More preferably, the thermoplastic elastomer is present in an amount from about 5% to about 40% of the total weight of the soft touch thermoplastic olefin composition; and most preferably, the thermoplastic elastomer is present in an amount of about 30% of the total weight of the soft touch thermoplastic olefin composition. Suitable thermoplastic elastomers include, for example, Santoprene® 8000 Rubber 8211-35W237 commercially available from Advanced Elastomer Systems located in Akron, Ohio; Vistalon 878 and MDV-91-9 each commercially available from Exxon Mobile Chemical; Sunigum 7752 commercially available from Zeon Chemicals, L.P. located in Louisville Ky.; and Polybond 3150 (a functionalized polypropylene) commercially available from Kangshin Industrial Co., Ltd located in Seoul Korea.

The soft touch thermoplastic olefin composition of the invention optionally includes a plastomer or a compatiblizer. Suitable plastomers include, but are not limited to, a metallocene catalyzed polyethylene plastomer or a Ziegler catalyzed polyethylene plastomer. Suitable plastomers include, for example, Exact™ 8201 commercially available from Exxon Mobil Chemical.

The thermoplatic olefin compositions of the present invention may also include one or more additives such as cross-linking agents, UV stabilizers, flame retardants, fillers, and pigments. Additives are potentially important in establishing the long term stability of the thermoplastic olefin compositions as well as chemical and impact resistance. Specifically, the thermoplatic olefin compositions of the present invention optionally includes UV stabilizers present in an amount from about 1500 ppm to about 2500 ppm. More preferably the UV stabilizers are present in an amount of 1750 ppm to about 2250 ppm, and most preferably, the UV stabilizers are present in an amount of about 2000 ppm. Suitable UV stabilizers include, but are not limited to hindered amine light stabilizers ("HALS"). Examples of HALS include: Chimassorb 944, Chimassorb 994, Chimassorb 905, Tinuvin 770, Tinuvin 992, Tinuvin 622, Tinuvin 144, and Spinuvex A36 available from Geigy; and Cyasorb UV 3346 and Cyasorb UV 944 commercially available American Cyanamide. Particularly preferred UV stabilizers are Cytec UV 3346 and Chemasorb 944 (poly[N,N-bis(2,2,6,6-tetramethyl-4-piperidinyl)-1,6-hexanediamine-co-2,4-dichloro-6-morpholino-1,3,5-triazine.) The thermoplatic olefin compositions still further optionally includes a flame retardant. Flame retardants include, for example, halogen-containing compounds, antimony oxides, or phosphorus compounds. Suitable flame retardants include, but are not limited to aluminum trihydrate, antimony oxide ($Sb_2O_3$), and decabromobiphenyl oxide ("decabrome"). Finally, the thermoplatic olefin compositions may also include fillers such as long glass fibers, carbon fiber, and talc. These fillers allow the material properties of the thermoplatic olefin compositions to be adjusted.

In another embodiment of the present invention, a method of forming the soft touch thermoplastic olefin compositions set forth above is provided. The method comprises combining a polypropylene-ethylene copolymer and a cross-linked or uncross-linked ethylene-propylene thermoplastic elastomer to form a mixture and blending the mixture at sufficient temperature to melt the mixture. Typically, the melt temperature is from about 400° F. to about 450° F. Again, as set forth above, the thermoplastic elastomer is present in a sufficient amount that the soft touch thermoplastic olefin composition has a 1% flexural secant modulus from about from about 10,000 psi to about 80,000 psi. Optionally, the plastomers and compatiblizer described above may also be added to the mixture prior to blending.

The following examples illustrate the various embodiments of the present invention. Those skilled in the art will recognize many variations that are within the spirit of the present invention and scope of the claims.

EXAMPLES

1. Blend Preparation

The soft touch blends summarized in Table 1 were prepared using a 40 mm twin screw Berstoff extruder. The extruder temperature profile ranged from 300–400° F. The melt temperature was around 400–450° F. The melt blend was subsequently pelletized and used for testing and evaluation. The properties of these blends are summarized in Tables 2 and 3. Shore A test were performed in accordance to ASTM D2240 to evaluate the hardness of the thermoplastic resins. The better compositions demonstrated lower Shore A hardness from about 84 to 94. The flexural modulus ("flex mod") 1% and 2% secant were determined in accordance with ASTM D790. The better compositions were observed to have values of both under 20,000 psi. The melt flow ratio ("MFR") and the high load melt flow index ("HLMFR") were determined following ASTM D1238. The density was determined in accordance to ASTM D2839, the compression set in accordance with ASTM D395, and the heat deflection in accordance with ASTM D648.

TABLE 1

Compositions of soft touch polyolefin blends.

| Example | Ethylene-propylene copolymer | Thermoplastic elastomer | Wt. % Thermoplastic elastomer | Plastomer | Wt. % Plastomer | 2% $TiO_2$ in PP0021 mixture (Wt %) |
|---|---|---|---|---|---|---|
| 1 | PP0021 | 8211-35W237 | 15 | | | |
| 2 | PP0021 | 8211-35W237 | 15 | Exact 8201 | 10 | |
| 3 | PP0021 | 8211-35W237 | 30 | | | |
| 4 | PP0021 | 8211-35W237 | 30 | | | 5 |
| 5 | PP0021 | 8211-35W237 | 30 | Exact 8201 | 10 | |
| 6 | PP0021 | 8211-35W237 | 30 | Exact 8201 | 10 | 5 |
| 7 | PP0021 | Vistalon 878 | 15 | | | |
| 8 | PP0021 | Vistalon 878 | 15 | Exact 8201 | 10 | |
| 9 | PP0021 | Vistalon 878 | 30 | | | |
| 10 | PP0021 | Vistalon 878 | 30 | | | 5 |
| 11 | PP0021 | Vistalon 878 | 30 | Exact 8201 | 10 | |
| 12 | PP0021 | Vistalon 878 | 30 | Exact 8201 | 10 | 5 |
| 13 | PP0021 | MDV-91-9 | 15 | | | |
| 14 | PP0021 | MDV-91-9 | 15 | Exact 8201 | 10 | |
| 15 | PP0021 | MDV-91-9 | 30 | | | |
| 16 | PP0021 | MDV-91-9 | 30 | | | 5 |
| 17 | PP0021 | MDV-91-9 | 30 | Exact 8201 | 10 | |
| 18 | PP0021 | MDV-91-9 | 30 | Exact 8201 | 10 | 5 |
| 19 | PP0021 | Vistalon 878 | 40 | | | 5 |
| 20 | PP0021 | MDV-91-9 | 40 | | | |
| 21 | PPTR477 | 8211-35W237 | 30 | | | |
| 22 | PPTR477 | 8211-35W237 | 50 | | | |
| 23 | PP7200AF | 8211-35W237 | 30 | | | |
| 24 | PP7200AF | 8211-35W237 | 50 | | | |
| 25 | PPTR346 | 8211-35W237 | 30 | | | |
| 26 | PPTR346 | 8211-35W237 | 50 | | | |
| 27 | PP8752HF | 8211-35W237 | 30 | | | |
| 28 | PP8752HF | 8211-35W237 | 50 | | | |
| 29 | TP38KC01 | 8211-35W237 | 30 | | | |
| 30 | TP38KC01 | 8211-35W237 | 50 | | | |
| 31 | PP0021 | Sunigum 7752 | 30 | Polybond 3150 | 10 | |

TABLE 2

Properties of soft touch polyolefin blends - part 1.

| Example | MFR (g/10 min) | HLMFR (g/10 min) | Ratio of HLMFR/MFR | Density (g/ml) | Shore A (max) | Shore A (15 seconds) |
|---|---|---|---|---|---|---|
| 1 | 1.72 | 143 | 83.1 | | 96 | 93 |
| 2 | 1.83 | 143 | 78.1 | 0.8883 | 94 | 91 |
| 3 | 2.27 | 263 | 115.9 | 0.895 | 93 | 89 |
| 4 | 2.5 | 302 | 121 | 0.8966 | 94 | 90 |
| 5 | 2.3 | 232 | 101 | 0.8952 | 91 | 86 |
| 6 | 2.53 | 271 | 107 | 0.8962 | 94 | 89 |
| 7 | 1.55 | 106 | 68.3 | 0.8783 | 96 | 93 |
| 8 | 1.51 | 97.6 | 64.6 | 0.8783 | 95 | 92 |
| 9 | 1.57 | 87.6 | 55.8 | 0.8737 | 95 | 89 |
| 10 | 1.56 | 89.3 | 57.2 | 0.8738 | 94 | 87 |
| 11 | 1.55 | 83.5 | 53.8 | 0.8747 | 92 | 86 |
| 12 | 1.285 | 73.0 | 56.8 | 0.8809 | 93 | 89 |
| 13 | 1.53 | 85.4 | 55.8 | 0.8786 | 96 | 92 |
| 14 | 1.53 | 89.9 | 58.7 | 0.8779 | 96 | 92 |
| 2 | 1.83 | 143 | 78.1 | 0.8883 | 94 | 91 |
| 15 | 2.09 | 107 | 51.2 | 0.8746 | 84 | 88 |
| 16 | 2.18 | 123 | 56.4 | 0.8750 | 94 | 88 |
| 17 | 2.16 | 104 | 48.1 | 0.8751 | 92 | 85 |
| 18 | 2.17 | 110 | 50.7 | 0.8769 | 94 | 88 |
| 19 | 1.5 | 74.9 | 49.9 | 0.8749 | 92 | 87 |
| 20 | 2.33 | 124 | 53.2 | 0.8739 | 92 | 86 |
| 21 | 5.5 | >1000 | >182 | 0.9140 | 99 | 97 |
| 22 | 15.3 | >1000 | >65 | 0.9196 | 97 | 96 |
| 23 | 4.02 | 772 | 192 | 0.9107 | 98 | 97 |
| 24 | 4.22 | >1000 | >237 | 0.9162 | 97 | 96 |
| 25 | 3.493 | 627 | 180 | 0.8957 | 98 | 97 |
| 26 | 3.858 | >1000 | >260 | 0.9113 | 97 | 95 |
| 27 | 3.885 | 691 | 178 | 0.8985 | 98 | 96 |
| 28 | 4.762 | >1000 | >210 | 0.9071 | 95 | 93 |
| 29 | 1.86 | 283 | 152 | 0.8939 | 98 | 96 |
| 30 | 2.39 | 732 | 306 | 0.9083 | 97 | 93 |
| 31 | 0.63 | 70.6 | 112 | 0.9294 | 97 | 95 |

TABLE 3

Properties of soft touch polyolefin blends - part 2.

| Example | Flex Mod 1% secant (psi) | Flex Mod 2% secant (psi) | Deflection Temperature @ 66 psi (° C.) | Compression Set (70° F., 22 hrs.) (%) |
|---|---|---|---|---|
| 1 | 17000 | 15600 | 43 | 83 |
| 2 | 14100 | 13000 | 41 | 84 |
| 3 | 10300 | 9500 | 38 | 85 |
| 4 | 11000 | 10100 | 39 | 84 |
| 5 | 8900 | 8400 | 37 | 88 |
| 6 | 10700 | 9900 | 38 | 87 |
| 7 | 20500 | 18800 | 42 | 84 |
| 8 | 16300 | 15400 | 41 | 80 |
| 9 | 14700 | 13600 | 38 | 82 |
| 10 | 13200 | 12300 | 38 | 86 |
| 11 | 12200 | 11400 | 37 | 95 |
| 12 | 14300 | 13200 | 38 | 95 |
| 13 | 19600 | 18100 | 40 | 69 |
| 14 | 17700 | 16300 | 39 | 81 |
| 15 | 15400 | 14100 | 38 | 88 |
| 16 | 17200 | 15800 | 39 | 87 |
| 17 | 12000 | 11100 | 37 | 98 |
| 18 | 14900 | 13700 | 38 | 98 |
| 19 | 12800 | 11800 | 38 | 87 |
| 20 | 14300 | 13100 | 38 | 100 |
| 21 | 75200 | 65500 | 66 | 71 |
| 22 | 37600 | 32800 | 53 | 66 |
| 2 | 14100 | 13000 | 41 | 84 |
| 23 | 49000 | 42800 | 61 | 73 |
| 24 | 27300 | 24000 | 50 | 67 |
| 25 | 56900 | 48600 | 58 | 79 |
| 26 | 26200 | 22600 | 46 | 69 |
| 27 | 50700 | 43000 | 53 | 71 |
| 28 | 27100 | 23100 | 45 | 66 |
| 29 | 39900 | 34500 | 56 | 82 |
| 30 | 23600 | 20500 | 46 | 76 |
| 31 | 30100 | 26900 | 46 | 75 |

2. Preparation of Soft Touch Bottles

Soft touch bottles were made using the blends in Table 1. A Krupp Kautex KB3 unit was used to blow mold 16 oz round bottles with the soft touch layer on the outside and an HD or PP layer inside. The temperature profile in the two extruders and in the die head was maintained around 375° F. Bottles formed in this manner were found to have improved soft touch/stiffness balance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A soft touch thermoplastic olefin composition, the composition comprising:

a polypropylene-ethylene copolymer having from about 3 to about 50 weight percent ethylene, a 1% flexural secant modulus from about 10,000 psi to about 40,000 psi, and having a melt flow from 0.01 to 500 dg/min and melting point from 115° C. to 160° C., and a cross-linked or uncross-linked ethylene-propylene thermoplastic elastomer, the thermoplastic elastomer being present in an amount from about 5% to about 40 percent of the weight of the soft touch thermoplastic olefin, wherein the soft touch thermoplastic olefin composition has a 1% flexural secant modulus from about from about 10,000 psi to about 80,000 psi and a Maximum Shore A hardness is from about 80 to about 100 and the compression set is from about 67% to about 100%.

2. The soft touch thermoplastic olefin composition film of claim 1 wherein the polypropylene-ethylene copolymer contains 8 to 40 weight percent ethylene and has a melt flow rate from 0.1 to 100 dg/min and a melting point from 125° C. to 160° C.

3. The soft touch thermoplastic olefin composition film of claim 1 wherein the polypropylene-ethylene copolymer contains 15 to 30 weight percent ethylene.

4. The soft touch thermoplastic olefin composition of claim 1 wherein the thermoplastic elastomer is present in an amount of about 30% of the total weight of the soft touch thermoplastic olefin composition.

5. The soft touch thermoplastic olefin composition of claim 1 wherein the polypropylene-ethylene copolymer has a 1% flexural secant modulus from about 15,000 psi to about 35,000 psi.

6. The soft touch thermoplastic olefin composition of claim 1 wherein the polypropylene-ethylene copolymer has a 1% flexural secant modulus of about 25,000 psi.

7. The soft touch thermoplastic olefin composition of claim 1 further comprising a plastomer or a compatiblizer.

8. The soft touch thermoplastic olefin composition of claim 7 wherein the plastomer is a metallocene catalyzed polyethylene plastomer or a Ziegler catalyzed polyethylene plastomer.

9. The soft touch thermoplastic olefin composition of claim 1, wherein the polypropylene-ethylene copolymer is made by the method comprising:

homopolymerizing propylene in a first reactor maintained at 50° C. to 100° C. and 250 psig to 650 psig in the presence of a catalyst system comprising a titanium-containing catalyst component and organoaluminum cocatalyst component to produce a first product;

feeding the first product into a second reactor maintained at 25° C. to 80° C. and 100 psig to 500 psig wherein propylene is copolymerized with ethylene, to obtain high rubber content modified polypropylene having reduced hexane extractables and improved paintability.

10. The soft touch thermoplastic olefin composition of claim 9 wherein:

(a) a control parameter $Q_c$ is calculated using eight integrated areas of the $^{13}C$ NMR spectrum corresponding to molecular structural features for copolymers of propylene and ethylene in accordance with the equation:

$$Q_c=A/B$$

where $A=1.167R_1+0.75R_2+1.5R_3+1.5R_4+1.167R_8$;

$B=0.667R_1+0.5R_2+R_5+R_6+R_7+0.667R_8$; and $R_1$ through $R_8$ have the following peak assignments:

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM; |

(b) the limits of $Q_c$ are selected to be within the range 0.65 to 1.35;

(c) the actual value of the parameter, $Q_A$, is determined for the polymer obtained from the second reactor; and (d) the ethylene feed is controlled to maintain $Q_A$ within the limits defined in (b).

11. The soft touch thermoplastic olefin composition of claim 10 wherein the limits of $Q_c$ are from about 0.65 to about 1.35.

12. The soft touch thermoplastic olefin composition of claim 10 wherein the limits of $Q_c$ are from about 0.90 to about 1.35.

13. The soft touch thermoplastic olefin composition of claim 10 wherein the first and second reactors are stirred, fixed-bed reactors.

14. The soft touch thermoplastic olefin composition of claim 10 wherein one or more a-olefins containing from 4 to 8 carbon atoms are included in the polymerization.

15. The soft touch thermoplastic olefin composition of claim 14 wherein an amount of ethylene sufficient to incorporate from 15 to 30 weight percent ethylene in the polymer is fed to the second reactor.

16. The soft touch thermoplastic olefin composition of claim 15 wherein an amount of hydrogen ranging from 0.1 to 5 mol percent is included in the first reactor and an amount of hydrogen from 1 to 10 mol percent is included in the second reactor.

17. An article made from the soft touch thermoplastic olefin composition of claim 1.

18. A method of forming a soft touch thermoplastic olefin composition, the method comprising:

combining a polypropylene-ethylene copolymer and a cross-linked or uncross-linked ethylene-propylene thermoplastic elastomer to form a mixture, the ethylene-propylene thermoplastic elastomer being present in an amount from about 5 to about 40% of the total weight of the soft touch thermoplastic olefin composition and the polypropylene-ethylene copolymer having from having from about 3 to about 50 weight percent ethylene, a 1% flexural secant modulus from about 10,000 psi to about 40,000 psi, and having a melt flow from 0.01 to 500 dg/min and melting point from 115° C. to 160° C.; and blending the mixture at a sufficient temperature to melt the mixture;

wherein the soft touch thermoplastic olefin composition has a 1% flexural secant modulus from about from about 10,000 psi to about 80,000 psi.

19. The method of claim 18 wherein the thermoplastic olefin composition has a Maximum Shore A hardness is from about 80 to about 100 and the compression set is from about 67% to about 100%.

20. The method of claim 18 wherein the polypropylene-ethylene copolymer contains 8 to 40 weight percent ethylene and has a melt flow rate from 0.1 to 100 dg/min and a melting point from 125° C. to 160° C.

21. The method of claim 18 wherein the polypropylene-ethylene copolymer has a 1% flexural secant modulus from about 15,000 psi to about 35,000 psi.

22. The method of claim 18 wherein the polypropylene-ethylene copolymer has a 1% flexural secant modulus of about 25,000 psi.

23. The method of claim 18 further comprising a plastomer or a compatiblizer.

24. The method of claim 23 wherein the plastomer is a metallocene catalyzed polyethylene plastomer or a Ziegler catalyzed polyethylene plastomer.

25. The method of claim 18, wherein the polypropylene-ethylene copolymer is made by the method comprising:

homopolymerizing propylene in a first reactor maintained at 50° C. to 100° C. and 250 psig to 650 psig in the presence of a catalyst system comprising a titanium-containing catalyst component and organoaluminum cocatalyst component to produce a first product;

feeding the first product into a second reactor maintained at 25° C. to 80° C. and 100 psig to 500 psig wherein propylene is copolymerized with ethylene, to obtain high rubber content modified polypropylene having reduced hexane extractables and improved paintability.

26. The method of claim 25 wherein:

(a) a control parameter $Q_c$ is calculated using eight integrated areas of the $^{13}$C NMR spectrum corresponding to molecular structural features for copolymers of propylene and ethylene in accordance with the equation:

$$Q_c = A/B$$

where $A = 1.167R_1 + 0.75R_2 + 1.5R_3 + 1.5R_4 + 1.167R_8$;

$B = 0.667R_1 + 0.5R_2 + R_5 + R_6 + R_7 + 0.667R_8$; and $R_1$ through $R_8$ have the following peak assignments:

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM; |

(b) the limits of $Q_c$ are selected to be within the range 0.65 to 1.35;

(c) the actual value of the parameter, $Q_A$, is determined for the polymer obtained from the second reactor; and (d) the ethylene feed is controlled to maintain $Q_A$ within the limits defined in (b).

* * * * *